(12) United States Patent
Campos et al.

(10) Patent No.: US 11,025,484 B2
(45) Date of Patent: Jun. 1, 2021

(54) AD-HOC WIRELESS MESH NETWORK SYSTEM AND METHODOLOGY FOR FAILURE REPORTING AND EMERGENCY COMMUNICATIONS

(71) Applicant: CABLE TELEVISION LABORATORIES, INC., Louisville, CO (US)

(72) Inventors: Luis Alberto Campos, Superior, CO (US); Bernardo Huberman, Palo Alto, CA (US)

(73) Assignee: CABLE TELEVISION LABORATORIES, INC., Louisville, CO (US)

( * ) Notice: Subject to any disclaimer, the term of this patent is extended or adjusted under 35 U.S.C. 154(b) by 154 days.

(21) Appl. No.: 16/252,358

(22) Filed: Jan. 18, 2019

(65) Prior Publication Data

US 2019/0222470 A1   Jul. 18, 2019

Related U.S. Application Data

(60) Provisional application No. 62/618,740, filed on Jan. 18, 2018.

(51) Int. Cl.
| | |
|---|---|
| *H04L 12/24* | (2006.01) |
| *H04W 72/04* | (2009.01) |
| *H04W 4/90* | (2018.01) |
| *H04W 48/16* | (2009.01) |
| *H04W 48/20* | (2009.01) |
| *H04W 88/08* | (2009.01) |
| *H04W 84/10* | (2009.01) |
| *H04W 84/18* | (2009.01) |

(52) U.S. Cl.
CPC .......... *H04L 41/0668* (2013.01); *H04W 4/90* (2018.02); *H04W 48/16* (2013.01); *H04W 48/20* (2013.01); *H04W 72/0453* (2013.01); *H04W 84/10* (2013.01); *H04W 84/18* (2013.01); *H04W 88/08* (2013.01)

(58) Field of Classification Search
CPC ... H04W 24/04; H04W 4/90; H04W 72/0453; H04W 48/16; H04W 48/20; H04L 41/0668
See application file for complete search history.

(56) References Cited

U.S. PATENT DOCUMENTS

| | | | | |
|---|---|---|---|---|
| 7,995,677 B2* | 8/2011 | Lee | ...................... | H04L 25/0246 375/316 |
| 8,059,622 B2* | 11/2011 | Zhu | ...................... | H04L 1/1854 370/338 |
| 8,660,497 B1* | 2/2014 | Zhang | .................. | H04B 7/0619 455/63.1 |

(Continued)

*Primary Examiner* — Redentor Pasia
(74) *Attorney, Agent, or Firm* — Lathrop GPM LLP

(57) ABSTRACT

An ad-hoc wireless network is implemented by a plurality of wireless access points to detect and report failure of a concurrently implemented conventional network. The wireless access points collect and store network status information of the conventional network and send the network status information to a centralized emergency manager when failure of the conventional network is detected. The ad-hoc wireless network may also provide backhaul connectivity to a wireless access point of the failed conventional network for emergency communication.

18 Claims, 7 Drawing Sheets

(56) References Cited

U.S. PATENT DOCUMENTS

| | | | | |
|---|---|---|---|---|
| 10,313,894 B1* | 6/2019 | Desclos | ............... | H04W 24/02 |
| 10,624,153 B2* | 4/2020 | Kakinada | .............. | H04W 36/08 |
| 10,652,797 B2* | 5/2020 | Hahn | ................... | H04W 36/20 |
| 10,694,562 B2* | 6/2020 | Su | ..................... | H04W 56/0015 |
| 2009/0315699 A1* | 12/2009 | Satish | ................... | H04L 47/125 |
| | | | | 340/533 |
| 2015/0223160 A1* | 8/2015 | Ho | .................... | H04W 72/0453 |
| | | | | 370/338 |
| 2018/0302832 A1* | 10/2018 | Huang | ................. | H04L 45/302 |

* cited by examiner

AD-HOC WIRELESS MESH NETWORK SYSTEM AND METHODOLOGY FOR FAILURE REPORTING AND EMERGENCY COMMUNICATIONS

RELATED APPLICATIONS

This application claims priority to U.S. Patent Application Ser. No. 62/618,740, titled "Ad-Hoc Wireless Mesh-Network System and Methodology for Failure Reporting and Emergency Communications", filed Jan. 18, 2018, and incorporated herein by reference.

BACKGROUND

A network is made up of many network components, any of which can fail, disrupting operation of the network. Once failed, diagnose the network fault is difficult since communication is disrupted and useful diagnostic information is lost.

SUMMARY

Establishing a capability for cross-network communication to address emergencies and augment bandwidth across networks may allow operators to substantially reduce network service disruption & related costs.

In one embodiment, an ad-hoc wireless network method reports failure and provides emergency communication of a conventional network. A wireless access point is controlled to implement access to the conventional network over a wireless channel using a plurality of subcarriers. The wireless access point is also controlled to communicate, using an emergency channel having a plurality of emergency subcarrier groups, with at least one other wireless access point to form an ad-hoc wireless network. The wireless access point stores network status information of the conventional network received from the other wireless access point via the ad-hoc wireless network. The wireless access point receives, via the ad-hoc wireless network and from the other wireless access point, a distress message indicating failure of the conventional network, and sends an emergency reporting message including the network status information to a centralized emergency manager.

In another embodiment, a wireless access point includes at least one radio operable to simultaneously transmit one or more subcarriers of a channel and receive one or more subcarriers of the channel, a processor, and a memory communicatively coupled with the processor. The memory stores machine readable instructions that, when executed by the processor, control the processor to: control the radio to implement access to the conventional network over a wireless channel using a plurality of subcarriers; control the radio to communicate, using an emergency channel having a plurality of emergency subcarrier groups, with at least one other wireless access point to form an ad-hoc wireless network; store network status information of the conventional network received from the other wireless access point via the ad-hoc wireless network; receive, via the ad-hoc wireless network and from the other wireless access point, a distress message indicating failure of the conventional network; and send, from the wireless access point, an emergency reporting message including the network status information to a centralized emergency manager.

DETAILED DESCRIPTION OF THE EMBODIMENTS

When on or more components of a cable network malfunction or fail, service reliability of the cable network deteriorates and/or network services fail altogether. Such failure causes costly network service remediation and/or recovery efforts by operators. Current technology limits the ability to discern and resolve these network failures and doesn't provide information needed to affect appropriate repairs. Repairs to recover operation of the network are urgent; however, it isn't possible to always respond immediately to every network failure due to lack of information on the network status when the failure occurred.

The present embodiments solve this problem by developing a network-agnostic application to communicate data and metrics necessary to identify and address imminent network failure and/or network failure and its respective cause(s). This is achieved by forming an ad-hoc wireless network to communicate network status information (e.g., metrics, parameters, characteristics, etc.) of the failing network that may aid recovery. Further, the ad-hoc network may provide backhaul connectivity for emergency services until full operation of the failed network is restored. Conceptually a "slider bar" (e.g. tiered emergency services) of capabilities may be provided by the ad-hoc network based upon the detected network failure situation. Such functionality may be invaluable to network operators and/or telecommunication provider and users of related services.

Figure 1:
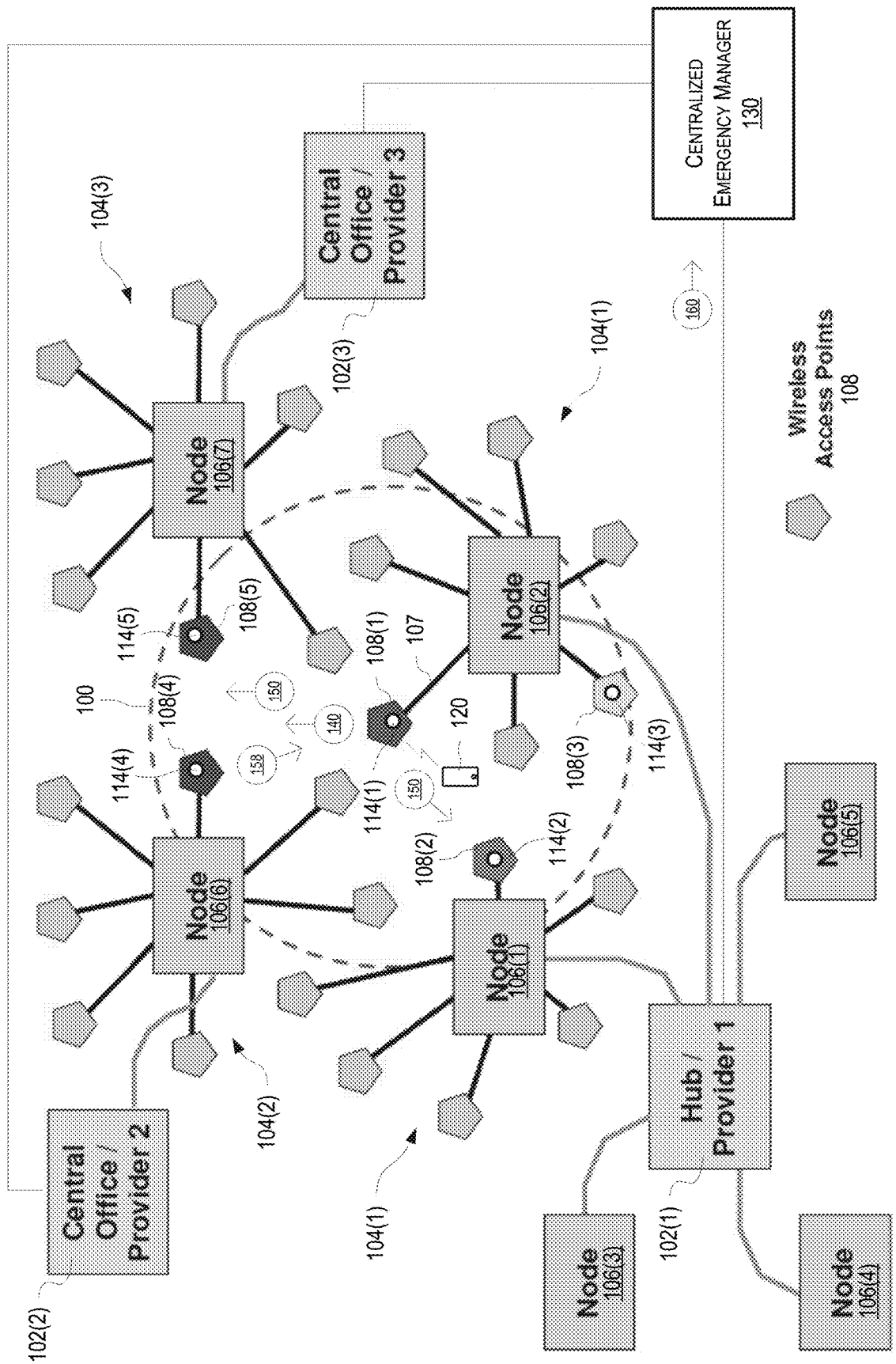
FIG. 1 is a schematic diagram illustrating one example ad-hoc wireless network for emergency communications and health reporting, in embodiments.

FIG. 1 is a schematic diagram illustrating one example ad-hoc wireless network 100 for emergency communications and health reporting. Three network providers 102(1), 102(2), and 102(3) each provide (e.g., operate) a conventional network 104(1), 104(2), and 104(3), respectively. Network provider 102(1) uses five nodes 106(1)-(5); network provider 102(2) uses one node 106(6); and network provider 102(3) uses one node 106(7). Each node 106 is for example a fiber tap and may connect, using a wired (copper) coaxial cable 107 or other such medium, to one or more wireless access points 108, positioned to provide wireless connectivity at a location (e.g., commercial area, office, residence, etc.). The wireless access point 108 (which may also be referred to as an AP) may include, or cooperate with, a cable modem (not shown) that interfaces with cable 107. Each conventional network 104 may connect, via network provider 102, to other networks, such as the Internet for example.

In normal operation of conventional network 104(1), a client device 120 (e.g., a smartphone, tablet, laptop, etc.) wirelessly connects to wireless access point 108(1) (e.g., using a Wi-Fi protocol), and thereby connects to the Internet via cable 107, node 106(2), and network provider 102(1). However, when a component (e.g., network provider 102, node 106, wireless access point 108, cable 107 and/or other media—fiber, etc.) of conventional network 104(1) fails, at least in part, or loses power, client device 120 may lose contact with the Internet for example. Usually, such failures often cannot be reported or diagnosed because of the failure of conventional network 104.

Figure 7:
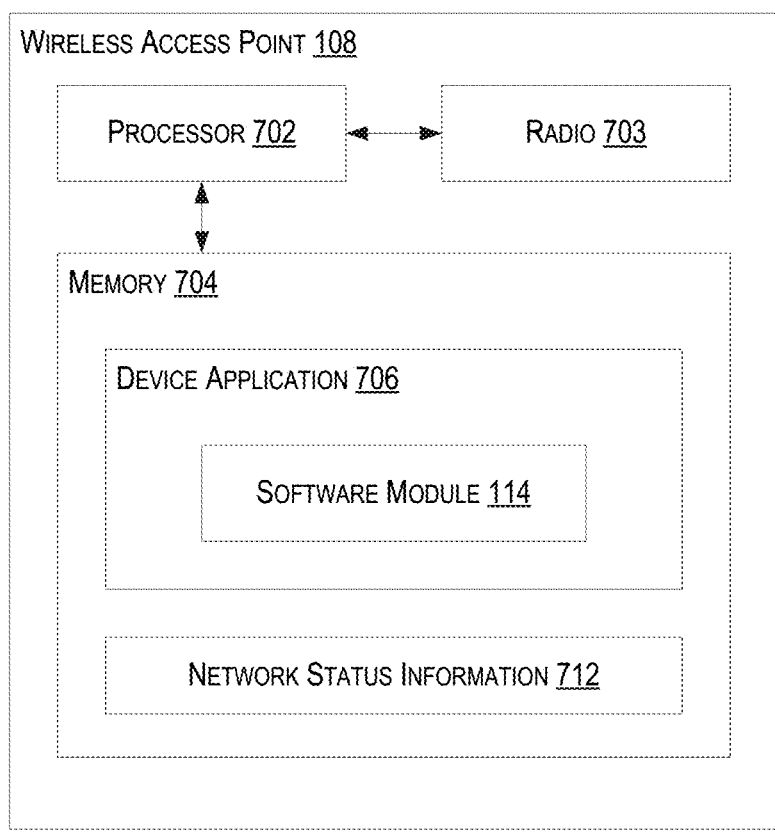
FIG. 7 is a block diagram illustrating one example wireless access point of FIG. 1, in embodiments.

FIG. 7 is a block diagram illustrating one example wireless access point 108. Wireless access point 108 may include a processor 702, at least one radio 703, and memory 704 storing a device application 706 that includes machine readable instructions executable by processor 702 to implement functionality of wireless access point 108 in the embodiments described herein. Advantageously, wireless access point 108 may be improved to include a software module 114 (illustratively shown within device application 706, but may be external thereto) that controls the wireless access points 108 to form ad-hoc wireless network 100 with other wireless access points 108 to provide emergency communication and network status information 712. Network status information 712 may include one or more of: health and performance metrics, spectrum occupancy (allowing better planning for channel allocation and interference management), location coordinates (facilitated through GPS or other means), transmit power, modulations and bands supported, and number of clients and clients' characteristics. Software module 114 may include machine readable instructions executable by processor 702 to enhance functionality of device application 706. Software module 114 may represent a modification of, or an addition to, wireless access point 108 that enhances functionality of wireless access point 108 to implement ad-hoc wireless network 100 of embodiments described herein.

To form ad-hoc wireless network 100, software module 114 controls (see process 500 of FIG. 5.) wireless access point 108 to wirelessly communicate with other neighboring wireless access points 108, leveraging existing transmit and receive resources of the wireless access point, such that ad-hoc wireless network 100 operates contemporaneously with conventional networks 104. Further, software module 114 may control radio 703 of wireless access point 108 to increase (as compared to transmission range when operating for conventional network 104) transmission range and thereby connect to a greater number of other wireless access points 108. Each wireless access point 108 that participates (e.g., that is configured with software module 114) in ad-hoc wireless network 100, maintains, and provides, network status information 712 of wirelessly detectable conventional networks 104, and of client devices (e.g., client device 120) that are served by participating wireless access points 108. In certain embodiments, one or more participating wireless access points 108 may collect information (e.g., frequencies and channels used, power levels received, and activity levels) of nonparticipating wireless access points 108. Although this information is limited, it may indicate a level of resources that may be used for emergency or alternate path transmissions. By distributing network status information 712 between members (e.g., wireless access points 108) of ad-hoc wireless network 100, when an emergency event (e.g., component failure of a conventional network 104, power outage, etc.) occurs, unaffected wireless access points 108 of ad-hoc wireless network 100 may report the failure and provide network status information 712, associated with the failed component, to a centralized emergency manager 130.

Centralized emergency manager 130 may be a cloud based server that receives network status information 712 from ad-hoc wireless network 100, via one or more network providers 102, when a problem with one or more conventional networks 104 occurs. In certain embodiments, central emergency manager 130 may be distributed between network providers 102, where each network provider 102 maintains an emergency management server to receive network status information 712 corresponding to components of their conventional network 104. When centralized emergency manager 130 is distributed between multiple servers, these servers may communicate with each other, via conventional networks (e.g., the Internet) to distribute network status information 712 to the appropriate network provider 102. Further, the network status information 712 may be handled securely such that only information of their own conventional network 104 (and components thereof) may be viewed by the respective network provider 102.

Emergency and Failure Assessment Protocol

An emergency and failure assessment protocol used by ad-hoc wireless network 100 may be universal rather than network provider specific, since all wireless access points 108 may benefit from using it and may help other wireless access points 108 that encounter an emergency event. Different network providers 102 may share/exchange outage information (e.g., network status information 712) to aid in troubleshooting network failures and to improve network operation. Ad-hoc wireless network 100 is not limited to a specific frequency and/or limited to a specific band; rather, software module 114 may detect and use any available band.

Wireless access points 108 used for Wi-Fi networks are prolific, being used in many homes, offices, consumer areas, and public spaces. This density of Wi-Fi based wireless access points 108 may be unrealized by other medium range wireless networks, making Wi-Fi implementations suitable for improvement by ad-hoc wireless network 100. Ad-hoc wireless network 100 takes advantage of this density to provide failure assessment and emergency communications by communicating wirelessly between wireless access points 108 within range of each other. Accordingly, the following examples describe use of ad-hoc wireless network 100 to support the Wi-Fi (IEEE 802.11) protocol; however, ad-hoc wireless network 100 may be implemented to support other protocols without departing from the scope of the embodiments described herein. For example, ad-hoc wireless network may be used with protocols such as LTE, LoRa, 802.16, Bluetooth, ZigBee, Zwave. Although these other protocols may not be implemented in as many network nodes and wireless access points as with Wi-Fi, some of these protocols may have an original wider bandwidth that may provide significant performance advantages for implementing emergency channels by dedicating all their transmission power to a fraction of their subcarriers for emergency purposes. Ones of these protocols that have a limited bandwidth may not provide as much advantage for use with ad-hoc wireless network 100 because the ratio between original channel and emergency channel bandwidth may not be as significant. Accordingly, although ad-hoc wireless network 100 may be implemented with any protocol, some protocols may have greater coverage advantage compared to others.

The 2.4 GHz Wi-Fi band is divided into 14 channels (11 usable channels in USA), each having a bandwidth of 20 MHz. For normal Wi-Fi operation, wireless access point 108 uses one (e.g., selected by a user to have the least interference from other devices) of the 14 channels. Each channel, whether it's 802.11a/g/n/ac, has 64 subcarriers spaced 312.5 KHz apart. 802.11a/g use 48 subcarriers for data, 4 for pilot, and 12 as null subcarriers. 802.11n/ac use 52 subcarriers for data, 4 for pilot, and 8 as null.

Where wireless access point 108 has one radio that operates in a spread spectrum mode (e.g., orthogonal frequency division multiplexing (OFDM)), the radio transmits all used subcarriers for the selected channel simultaneously and the transmission power is divided across all used subcarriers. This power defines the range of wireless access point 108 for Wi-Fi operation. Software module 114 may control radio 703 of wireless access point 108 to use low modulation order and to concentrate transmitter power into a smaller (as compared to conventional operation of the access point) group of subcarriers (e.g., see emergency subcarrier group 204 of FIG. 2) to increase power spectral density and thereby increase communication range of wireless access point 108 to reach other access points that are further away (as compared to conventional operational range of the wireless access point). For example, ad-hoc wireless network 100 may transmit using only a few (e.g., a group of three) of the available subcarriers, and therefore the transmission power is distributed across a smaller portion of the spectrum, resulting in a greater range, albeit at a reduced data rate. In certain embodiments, these groups of subcarriers are selected by each wireless access point 108 to avoid or limit collisions. The transmit power spectral density is maximized because all power from wireless access point 108, which is capable of transmission over a wider bandwidth under normal operation, is dedicated for transmission on fewer subcarriers during transmission for ad-hoc wireless network 100. When wireless access point 108 determines that an emergency subcarrier group is unoccupied, the wireless access point may transmit its ID and characteristics on the unoccupied band, in a network join request message, to temporarily claim the emergency subcarrier group (group of subcarriers) within the channel.

Figure 2:
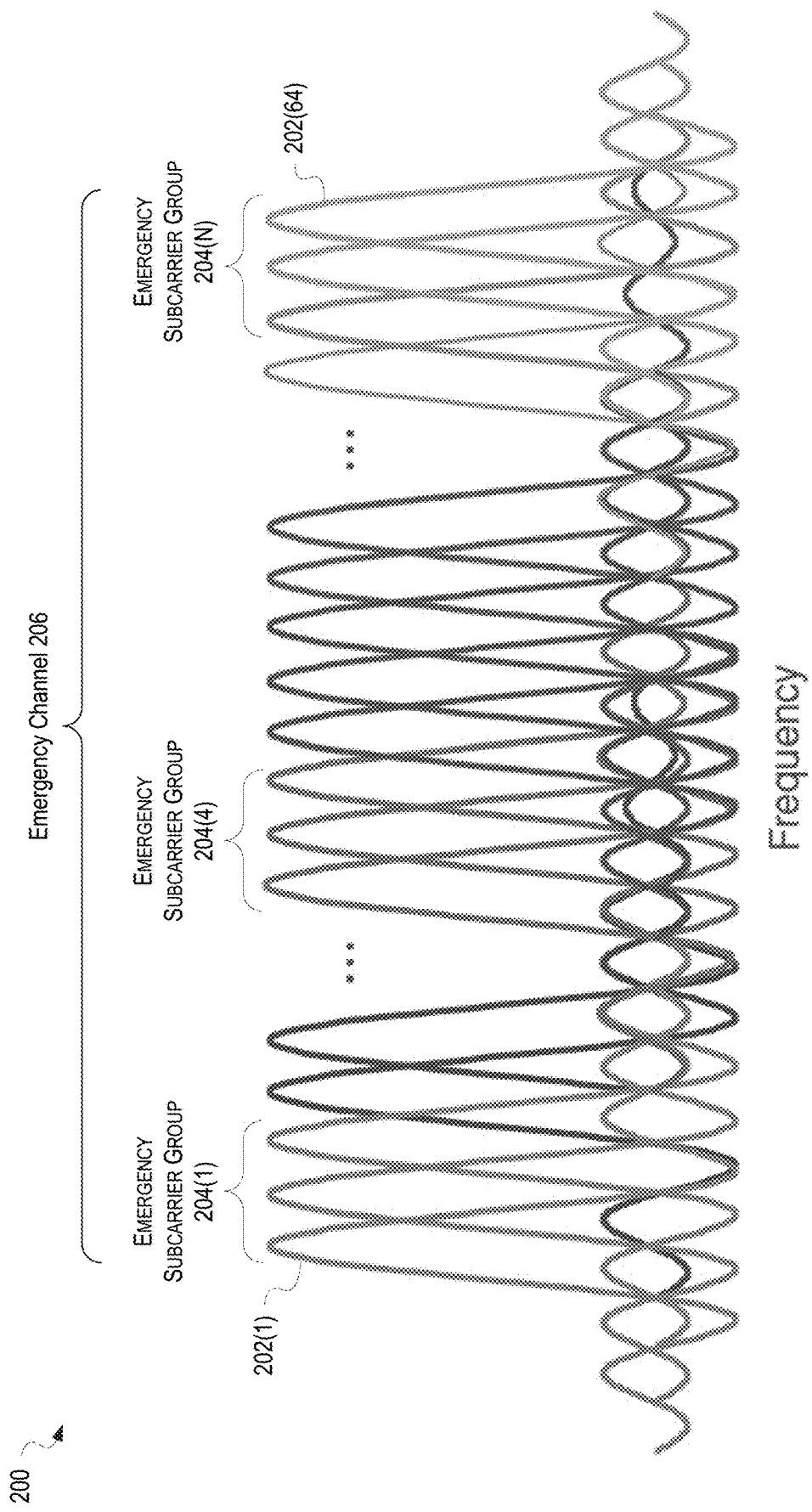
FIG. 2 is a graph showing example allocation of groups of subcarriers as emergency subcarrier groups within an emergency channel used by the ad-hoc wireless network of FIG. 1, in embodiments.

FIG. 2 is a graph 200 showing example allocation of groups of subcarriers 202 as emergency subcarrier groups 204 within an emergency channel 206 (e.g., one Wi-Fi channel) for use by ad-hoc wireless network 100. Wireless access points 108 participating in ad-hoc wireless network 100 thus use the same emergency channel 206, however, wireless access point 108 may participate in more than one ad-hoc wireless network 100, where each ad-hoc wireless network 100 may use a different emergency channel 206.

Emergency channel 206 is divided into a plurality of emergency subcarrier groups 204, each consisting of a group of different adjacent subcarriers 202 of emergency channel 206, as shown in FIG. 2. Wireless access point 108 transmits using one emergency subcarrier group 204, thereby transmitting on a subset of subcarriers of entire emergency channel 206, unlike Wi-Fi, where the wireless channel is filled by a single transmission. Each wireless access point 108 may select a different emergency subcarrier group 204 and thus multiple wireless access points 108 may transmit simultaneously without collision. For example, when several wireless access points 108 are within wireless range of each other and are affected by the same power outage, each may simultaneously transmit a priority distress message 140 (e.g., an emergency leave message) over the ad-hoc wireless network 100 using their selected emergency subcarrier group 204 without collision, thereby improving reporting of the extent of the network failure and power outage.

When emergency channel 206 is implement using a Wi-Fi wireless channel, emergency channel 206 may also include sixty-four subcarriers. By allocating a group of three subcarriers to each emergency subcarrier group 204, at least sixteen wireless access points 108 may use a single 20 MHz channel without collision. In certain embodiments, where more wireless access points 108 are within wireless range of one another than may operate within a single emergency channel 206 (e.g., a Wi-Fi channel with 64 subcarriers), ad-hoc wireless network 100 may use additional emergency channels 206 for allocating sufficient emergency subcarrier groups 204. In certain embodiments implemented using the Wi-Fi protocol, since emergency channel 206 may use fewer subcarriers than available in the Wi-Fi channel, ad-hoc wireless network 100 may implement multiple emergency channels 206 within one Wi-Fi channel. Wireless access point 108 uses carrier sensing to determine when the Wi-Fi channel, emergency channel 206 and/or emergency subcarrier groups 204 are silent, and thus available for use, to determine transmit opportunities.

Figure 3:
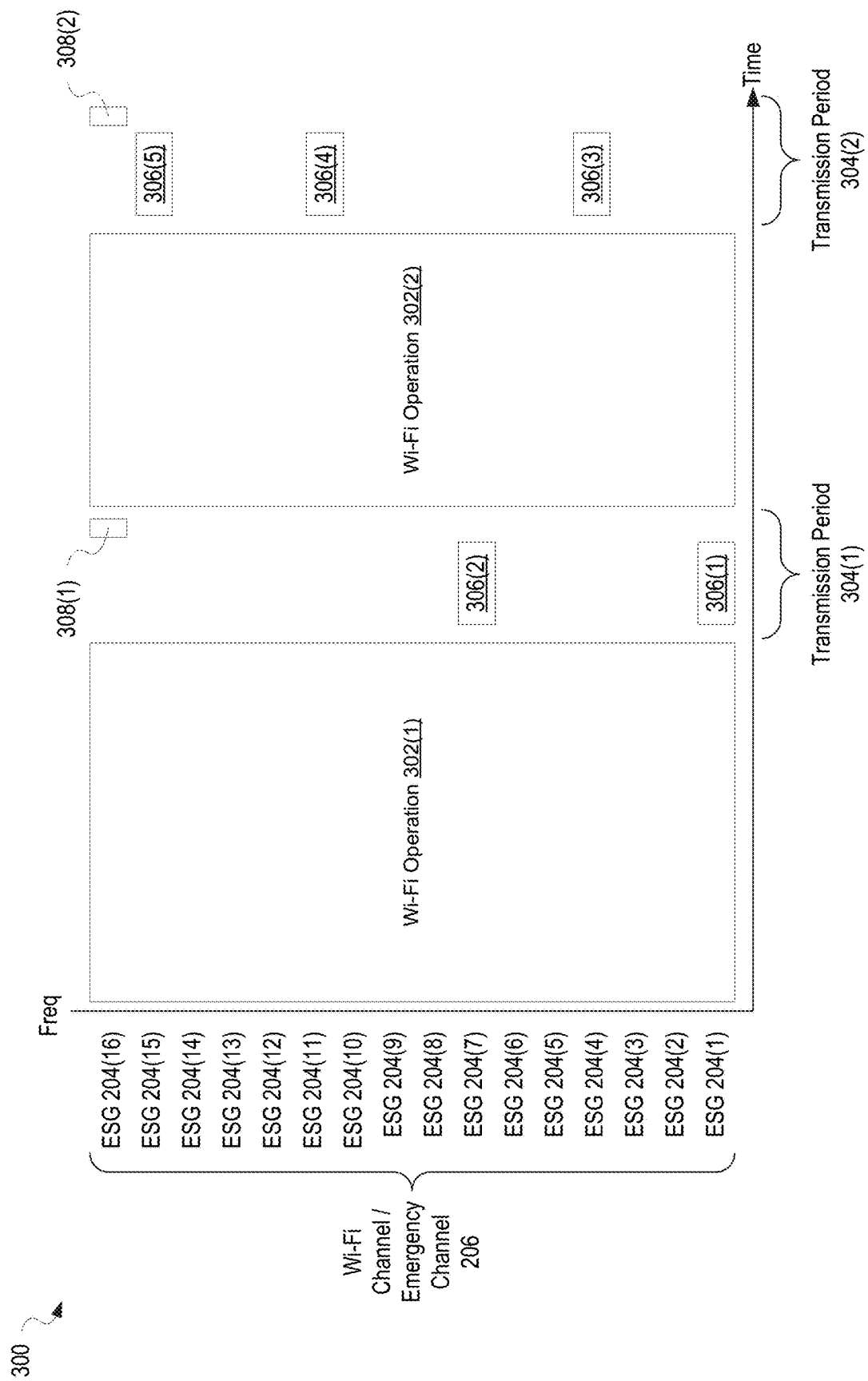
FIG. 3 is a graph illustrating use of one Wi-Fi channel as emergency channel illustrating example time division multiplexing between Wi-Fi use and use by the ad-hoc wireless network of FIG. 1, in embodiments.

FIG. 3 is a graph 300 illustrating use of one Wi-Fi channel as emergency channel 206 illustrating example time division multiplexing between Wi-Fi use and use by ad-hoc wireless network 100. The horizontal axis shows time and the vertical axis shows frequency of emergency channel 206 divided into sixteen emergency subcarrier groups 204. Although shown to overlap with emergency channel 206, each wireless access point 108 may operate its Wi-Fi network of different Wi-Fi channels. and may therefore not, or partially, overlap with emergency channel 206. Wi-Fi operation 302(1) and 302(2) represents use of any Wi-Fi channel (each with sixty-four subcarriers) as defined by the respective Wi-Fi protocol. Particularly, wireless access points 108 that are within wireless range of each another preferably use different Wi-Fi channels to reduce interference. During periods of Wi-Fi operation 302, emergency channel 206 is not used by wireless access points 108 of ad-hoc wireless network 100 (although, Wi-Fi operation 302 may occur at the same frequencies).

Accordingly, Wi-Fi operation 302 and transmission periods 304 of ad-hoc wireless network 100 are time division multiplexed. As shown in the example of FIG. 3, transmission periods 304(1), 304(2), and so on, are interleaved with periods of Wi-Fi operation 302(1), 302(2), and so on. To reduce the impact of ad-hoc wireless network 100 on regular Wi-Fi operation, and particularly when emergency backhaul is provided via ad-hoc wireless network 100 to one or more wireless access points 108, ad-hoc wireless network 100 may limit time resource use no more than a percentage (e.g., twenty percent, ten percent, five percent, etc.). When conveying only network status information (e.g., network status information 712), the impact of ad-hoc wireless network 100 on operation of the conventional protocol (e.g., Wi-Fi) is negligible. Accordingly, communication between wireless access points 108 and their clients (e.g., client device 120) occur during Wi-Fi operations 302, and communication between wireless access points 108 of ad-hoc wireless network 100 occurs during transmission periods 304. In certain embodiment, to prevent disruption of normal protocol (e.g., Wi-Fi) operation, ad-hoc wireless network 100 may wait for longer periods of silence before communicating, thereby giving greater priority to normal protocol operation.

In the example of FIG. 3, during transmission period 304(1), a first wireless access point (e.g., wireless access point 108(2)) generates a transmission 306(1) on emergency subcarrier group 204(1) simultaneously with a second wireless access point (e.g., wireless access point 108(4)) on emergency subcarrier group 204(7). In response, a master wireless access point (e.g., wireless access point 108(1)) may generate a transmission 308(1) (e.g., acknowledgment to one or both of transmissions 306(1) and 306(2), network status update, and/or emergency backhaul data transfer) using its selected emergency subcarrier group 204(16). However, where transmission 306 indicates immanent failure of the corresponding wireless access point 108, acknowledgements may not be required, since the wireless access point may not be alive (e.g., due to lack of power). Accordingly, acknowledgements may only be used for emergency backhaul. During subsequent transmission period 304(2), third, fourth, and fifth wireless access points 108 generate transmissions 306(3), 306(4), 306(5) on emergency subcarrier groups 204(4), 204(11), and 204(15), respectively, and the master wireless access point (e.g., wireless access point 108(1)) may generate transmission 308(2). Since each wireless access point 108 transmits only on its selected emergency subcarrier group 204 (e.g., using a small group of subcarriers of the emergency channel 206), no collision occurs and receiving wireless access points 108 may receive communications from multiple wireless access points simultaneously. In one example of operation, each wireless access point 108 receives the entire channel (e.g., all subcarriers) to decode received data. However, when the wireless access point 108 detects that the received signal occupies only a portion (e.g., a subset of subcarriers) of the channel's spectrum, the wireless access point determines that the transmission is to be processed differently, to separate data received concurrently from different wireless access points over different emergency subcarrier groups 204. As noted above, wireless access point 108 may only transmit when the emergency channel or emergency subcarrier group 204 is available (e.g., no carrier signal detected).

During failure of a conventional network 104, one wireless access point 108 may provide emergency backhaul connectivity to another wireless access point, such as for an emergency call. Ad-hoc wireless network 100 thereby allows information to be exchanged between pairs of wireless access points 108 during each transmission period 304. For example, where cable 107 fails, wireless access point 108(1) may request, over ad-hoc wireless network 100, emergency backhaul connectivity for an emergency call from client device 120. Wireless access point 108(2) may respond, allocating resources of wireless access point 108(2) and node 106(1) for the emergency call and configuring a data path within ad-hoc wireless network 100 to transfer data during transmission periods 304.

Network Provider Cooperation

Coordination among owners of wireless access points 108 and/or network providers 110 may facilitate and/or enhance transport of network status information 712 provided by or through each wireless access point 108. For example, network providers 102 may have agreements to provide emergency backhaul connectivity to each other during network failures, and may agree to transport of network status information 712 to centralized emergency manager 130. At least one wireless access point 108 that is a member of ad-hoc wireless network 100 is configured to pass network status information 712, including one or more of aggregate failure, health, reliability, and emergency channel information, at intervals or as the event occurs, to centralized emergency manager 130 to enable intelligent action to be taken when a failure, emergency, and/or reportable event, occurs. Further, this coordination may include incorporation of software module 114 with each wireless access point 108 to implement ad-hoc wireless network 100.

In the example of FIG. 1, wireless access points 108(1)-(5) are each configured with software module 114 and cooperate to form ad-hoc wireless network 100 in parallel to wireless access points 108 supporting wireless connectivity of client devices (e.g., client device 120) to conventional networks 104. Conventional networks 104 may continue to operate independently, as run by the corresponding network providers 102. That is, each wireless access point 108(1)-(5) participating in ad-hoc wireless network 100 also participates in one conventional network 104 and thus connects (for data backhaul) to a corresponding network provider 102. Each network component (e.g., node 106, network provider 102, etc.) may allocate resources of conventional network 104 for use by connecting client devices (e.g., client device 120). For example, when client device 120 makes a call, wireless access point 108(1), node 106(2), and network provider 102(1) may allocate resources of conventional network 104(1) for the call. Allocation of network resources may similarly occur when emergency backhaul is provided.

Sensing Power Failure and Reporting Before AP is Dead

Failure of components of conventional network 104 may occur due to several reasons, including loss of power at wireless access point 108. However, loss of power may not result in instantaneous failure of the wireless access point 108, since voltage and current within wireless access point 108 may take a few milliseconds to drop below levels required for operation of the access point. Accordingly, wireless access point 108 may detect when it loses power, and may leverage an ultra-low latency protocol implemented by ad-hoc wireless network 100 to send a priority distress message 140 that overrides all other messages to indicate the imminent power failure and loss of connectivity of wireless access point 108. As described above, ad-hoc wireless network 100 may be implemented such that conventional protocol traffic receive priority (e.g., wireless access point 108 determines when the channel is not being used) and thereby reduces impact on the conventional protocol traffic. However, when wireless access point 108 loses power, it transmits immediately on its selected emergency subcarrier group 204, which may impact conventional protocol traffic, but only for this emergency.

Continuing with the example of FIG. 1, where power to wireless access point 108(1) fails, wireless access point 108(1) may transmit priority distress message 140 over ad-hoc wireless network 100, to be received by wireless access point 108(4). Wireless access point 108(4) may notify centralized emergency manager 130, via node 106(6) and network provider 102(2), of the power failure at wireless access point 108(1), and centralized emergency manager 130 may, in turn, notify network provider 110(1) of the failure. In certain embodiments, when centralized emergency manager 130 receives multiple indications of power failure that indicate a power outage over a certain area, centralized emergency manager 130 may also notify a corresponding power company associated with the area of the power outage such that action may be expedited to resolve the issue.

Loss in Network Connectivity

Continuing with the example of FIG. 1, where wireless access point 108(1) detects loss in network connectivity between wireless access point 108(1) and network provider 102(1) (e.g., failure of the default backhaul link for wireless access point 108(1)), wireless access point 108(1) may communicate, using ad-hoc wireless network 100, with a neighboring wireless access point 108(2)-(5) to request an emergency wireless backhaul channel. More than one neighboring wireless access point 108 may answer with availability of the emergency wireless backhaul channel. Neighboring wireless access points 108(2)-(5) may also provide centralized emergency manager 130 (or other controller/processor/database) with outage information, and centralized emergency manager 130 may determine service reliability. Centralized emergency manager 130 may receive multiple emergency reporting messages 160 for the same emergency/failure when multiple wireless access points 108 receive the same priority distress message 140. Centralized emergency manager 130 may coordinate emergency backhaul between multiple providers that have indicated willingness to help in emergencies (e.g., like HAM radio operators in the olden days passing emergency messages after earthquakes or other natural disasters).

Service Brown-Out Versus Service Black-Out

Power outages, as previously discussed, may be considered as black-out service conditions when associated with interruption of conventional (e.g., non-emergency) network services. Under certain conditions, the conventional network service may not be interrupted (e.g., may not fail completely), but may suffer performance degradation resulting in a network performance level that is below a pre-determined threshold. These conditions (referred to as brownout conditions) may also be detected and reported via ad-hoc wireless network 100 to centralized emergency manager 130, which in turn may send alert messages to the corresponding network provider 102 for immediate corrective action when possible. For example, where network provider 102 has a service level agreements (SLAs) with customers, maintaining the quality of service provided by conventional network 104 is important. Accordingly, network providers 102 may define performance threshold(s) corresponding to SLAs for use within centralized emergency manager 130 such that alert messages are triggered from centralized emergency manager 130 when quality of service of conventional network 104 falls below the defined performance threshold(s).

The information obtained by network provider 102 from centralized emergency manager 130 when a performance problem is detected, combined with the topology and resources assigned to different portions of the corresponding conventional network 104, may provide network provider 102 with knowledge of how to reconfigure conventional network 104 to make it more resilient to future similar events.

Continuing with the example of FIG. 1, ad-hoc wireless network 100, shown for wireless access point 108(1), includes wireless access points 108(1) and 108(3) that are attached to the same node (e.g., node 106(2) serving the same area). However, greater robustness is achieved when ad-hoc wireless network 100 also includes wireless access points 108 attached to other nodes (e.g., wireless access point 108(2) attached to node 106(1)), and/or includes wireless access points 108 attached to other networks, such as wireless access points 108(4) and 108(5) of conventional networks 104(2) and 104(3), respectively. A cellular based wireless access point, such as a cell phone operating in "Hot-Spot" mode, may also be included within ad-hoc wireless network 100, thereby further enhancing reliability of ad-hoc wireless network 100 to report network status information 712 of conventional networks 104.

Figure 4:
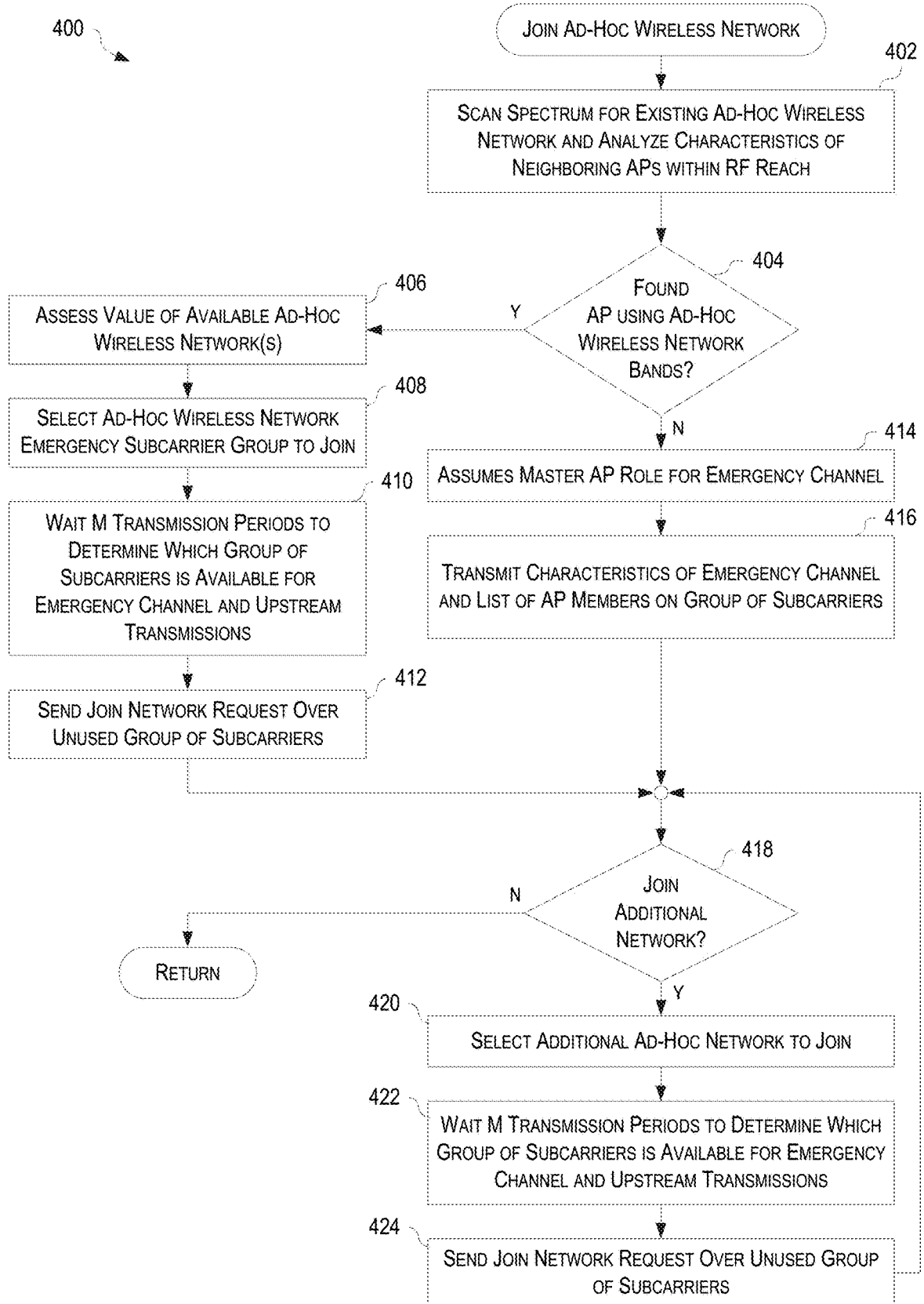
FIG. 4 is a flowchart illustrating one example process for a wireless access point to join the ad-hoc wireless network of FIG. 1, in embodiments.
Figure 5:
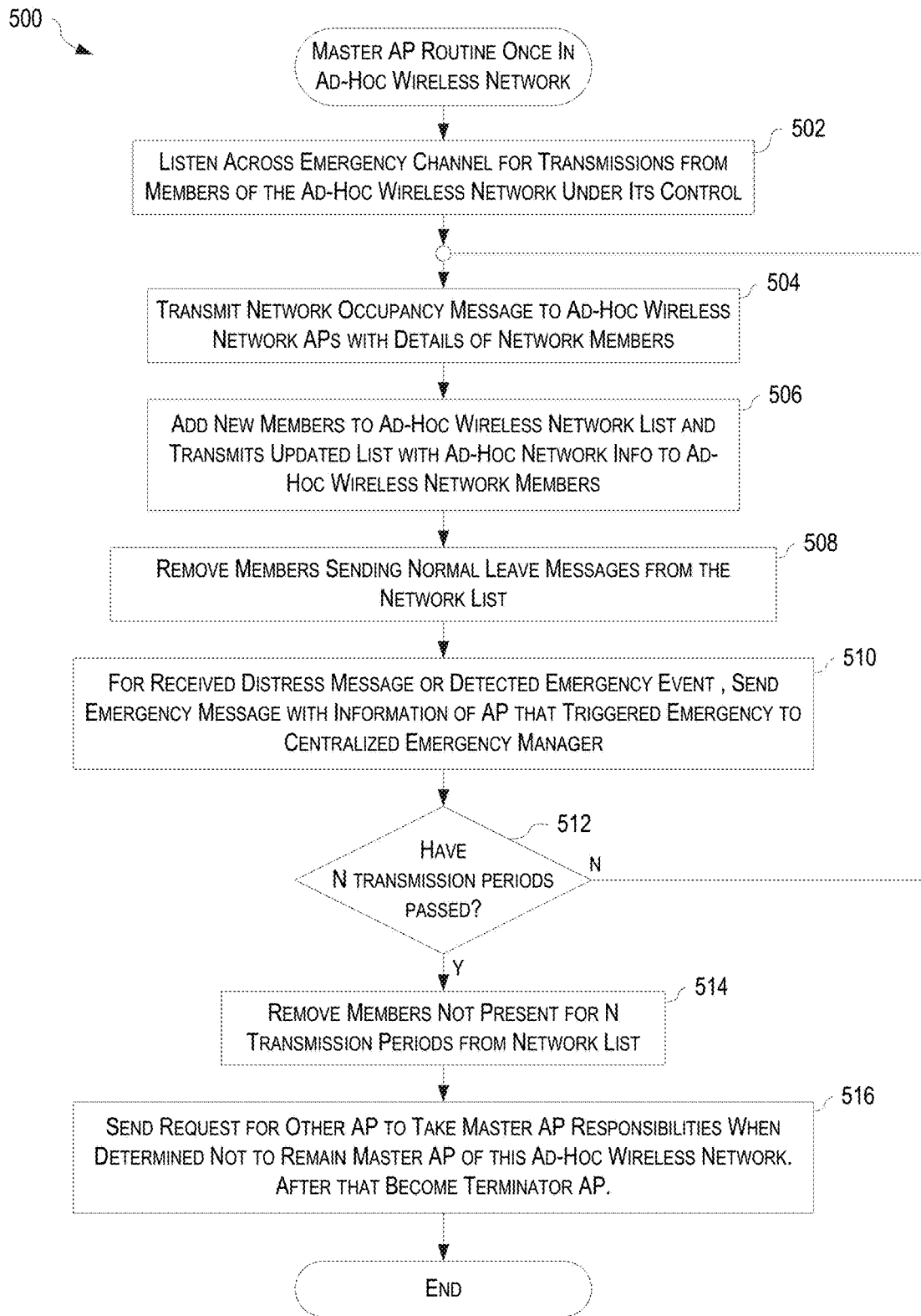
FIG. 5 is a flowchart illustrating one example process for maintaining the ad-hoc wireless network of FIG. 1, in embodiments.
Figure 6:
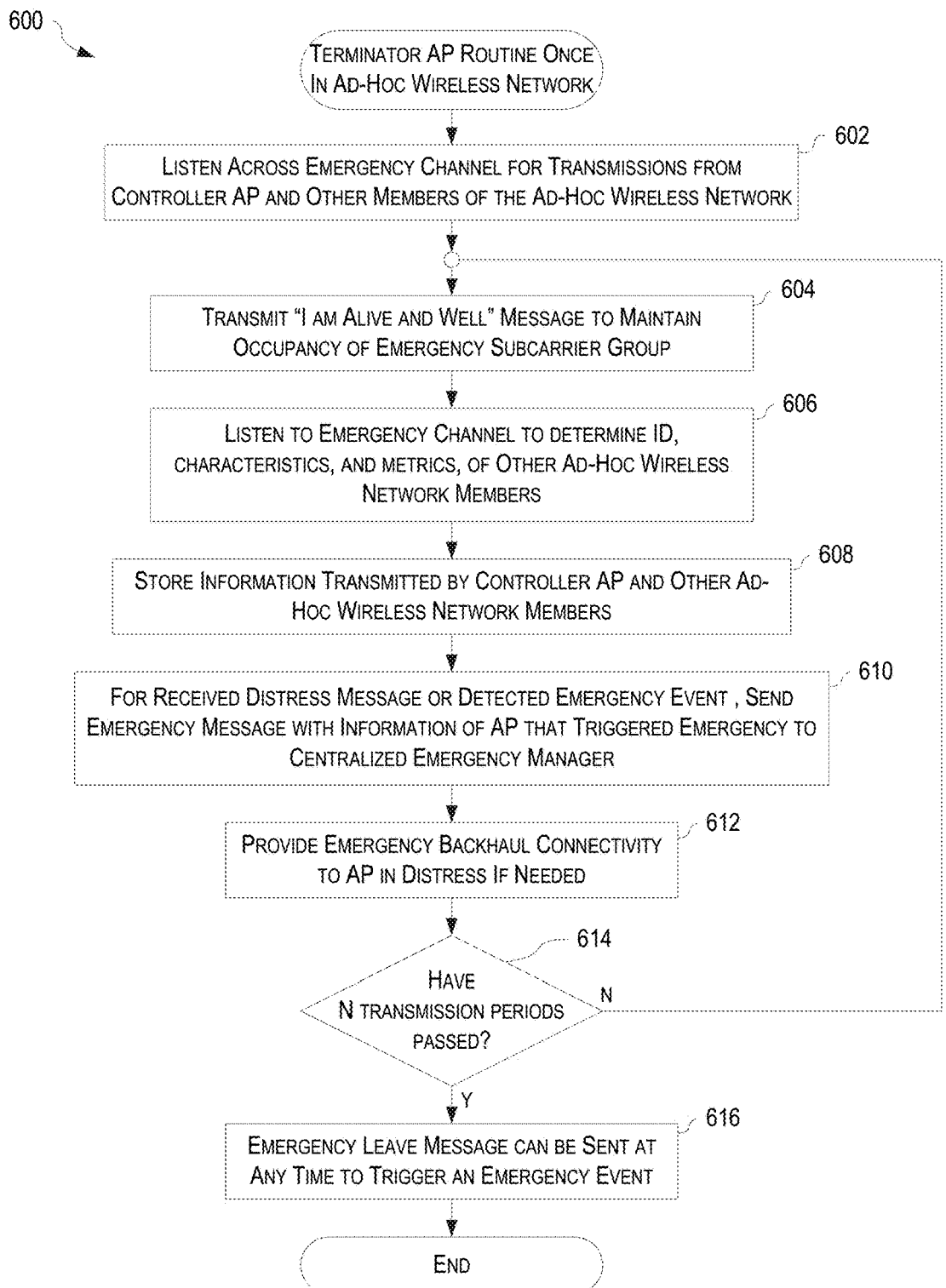
FIG. 6 is a flowchart illustrating one example process for maintaining the ad-hoc wireless network of FIG. 1, in embodiments.

FIGS. 4, 5, and 6 are flowcharts illustrating example processes that enable ad-hoc wireless network 100. In these examples, a wireless access point (e.g., wireless access point 108(1)) operates as master of the ad-hoc wireless network 100, thereby managing its own emergency wireless domain. However, the master wireless access point 108 of each ad-hoc wireless network may be controlled by, and/or coordinate with, centralized emergency manager 130, for example to decide which emergency channel 206 and/or emergency subcarrier groups 204 to use, what population to serve, and so on. Any participating wireless access point 108 may become master of the ad-hoc wireless network 100 and operate to convey information from, and/or provide help to, a neighboring wireless access point.

FIG. 4 is a flowchart illustrating one example process 400 for a wireless access point 108 to join ad-hoc wireless network 100. Process 400 is for example implemented in wireless access points 108. In block 402, process 400 scans the wireless spectrum for an existing ad-hoc wireless network and analyze characteristics of neighboring wireless access points within RF reach. In one example of block 402, software module 114 controls the radio of wireless access point 108(4) to scan for ad-hoc wireless network 100, and to analyze characteristics of neighboring wireless access points 108.

Block 404 is a decision. If, in block 404, process 400 determines that wireless network bands were received and indicate an existing ad-hoc wireless network, process 400 continues with block 406; otherwise, process 400 continues with block 414. In block 406, process 400 assesses value of available ad-hoc wireless network(s). In one example of block 406, wireless access point 108(4) assesses the value (e.g., usefulness to wireless access point 108(4)) of ad-hoc wireless network 100. For example, there may be more than one emergency channel 206 detectable, each corresponding to a different ad-hoc wireless network 100 with its own master wireless access point. Within each emergency channel 206, the corresponding master wireless access point 108 transmits a periodic beacon (e.g., a master message) indicating that it is the master AP and providing additional information indicating how many members (e.g., other wireless access points) belong to that ad-hoc wireless network and thus operate in that emergency channel, what transmit power the master wireless access point is using, and so on. This beacon is transmitted at least once every M transmission periods 304. Therefore, by listening for M transmission periods, the wireless access point 108 should sense the beacon of each master wireless access point (e.g., on each emergency channel) within range. The maximum duration of Wi-Fi transmissions may be used to determine the number of transmissions periods M.

In block 408, process 400 selects an ad-hoc wireless network emergency subcarrier group to join. In one example of block, wireless access point 108(4) selects ad-hoc wireless network 100. In block 410, process 400 waits M transmission periods to determine which group of subcarriers is available to use for emergency channel and upstream transmissions. In one example of block 410, wireless access point 108(4) receives during eight consecutive ad-hoc wireless network 100 transmission periods 304 to detect transmissions 306 from other wireless access points 108 to determine which emergency subcarrier groups 204 of the emergency channel 206 are in use. In block 412, process 400 sends a join network request over unused group of subcarriers. In one example of block 412, wireless access point 108(4) transmits a join network message using emergency subcarrier group 204(4). Process 400 continues with block 418.

In block 414, process 400 assumes master AP role for the emergency subcarrier group. In one example of block 414, wireless access point 108(1) assumes a master role for ad-hoc wireless network 100 and emergency channel 206. In block 416, process 400 transmits characteristics of the emergency channel and a list of AP members on the group of subcarriers. In one example of block 416, wireless access point 108(1) transmits characteristics of newly formed ad-hoc wireless network 100 over a selected one of emergency subcarrier groups 204. Wireless access point 108 may use multiple criteria for selecting which emergency subcarrier group 204 to use. In one example, wireless access point 108 may use proximity, determined by comparing receive signal strength of the beacon and comparing it to the transmit power defined within that beacon (e.g., master wireless access point message). In another example, the wireless access point 108 may monitor the emergency channel 206 to determine how busy it is, selecting a less busy emergency channel to avoid collisions when a disruption simultaneously impacts many devices and further to avoid competition for resources. The master access point (e.g., wireless access point 108(1)) maintains a list of other wireless access points 108 that join the ad-hoc wireless network 100, including which emergency subcarrier group 204 that the wireless access points 108 are using.

Block 418 is a decision. If, in block 418, process 400 determines to join an additional network, process 400 continues with block 420; otherwise, process 400 terminates.

In block 420, process 400 selects an additional ad-hoc network to join. In one example of block 420, wireless access point 108(4) selects another ad-hoc wireless network (other than ad-hoc wireless network 100), and within range of wireless access point 108(4), to join. In block 422, process 400 waits M (see definition of M above) transmission periods to determine which group of subcarriers is available to use for emergency channel and upstream transmissions. In one example of block 422, wireless access point 108(4) receives during eight consecutive ad-hoc wireless network 100 transmission periods 304 to detect transmissions 306 from other wireless access points 108 to determine which emergency subcarrier groups 204 of the emergency channel 206 are in use. In block 424, process 400 sends a join network request over unused group of subcarriers. In one example of block 424, wireless access point 108(4) transmits a join network message using emergency subcarrier group 204(4). Process 400 continues with block 418 to join additional ad-hoc wireless networks.

FIG. 5 is a flowchart illustrating one example process 500 for maintaining ad-hoc wireless network 100. Process 500 is for example implemented within wireless access point 108(1) of FIG. 1 to operate as master AP of ad-hoc wireless network 100.

In block 502, process 500 listens across the emergency channel for transmissions from members of the ad-hoc wireless network under its control. In one example of block 502, software module 114(1) controls wireless access point 108(1) to monitor emergency channel 206 during transmission period 304 to receive transmissions 306 from other wireless access points 108. In block 504, process 500 transmits a network occupancy message to ad-hoc wireless network APs with details of network members. In one example of block 504, software module 114(1) controls wireless access point 108(1) to send a network occupancy message 150, including characteristics of members of ad-hoc wireless network 100 and assigned emergency subcarrier groups 204, to wireless access points 108(2)-(5) using its selected emergency subcarrier group 204(16). In block 506, process 500 adds new members to ad-hoc wireless network list and transmit updated list with ad-hoc wireless network information to ad-hoc wireless network members. In one example of block 506, upon receiving a join network request in transmission 306(2) from wireless access point 108(4), wireless access point 108(1) updates its list of members of ad-hoc wireless network 100 and generates network occupancy message 150.

In block 508, process 500 removes members sending normal leave messages from the network list. In one example of block 508, wireless access point 108(1) removes wireless access point 108(4) from the list of members of ad-hoc wireless network 100 when transmission 306(2) is a normal leave message from wireless access point 108(4). In block 510, process 500, for a received distress message or a detected emergency event, sends an emergency reporting message with information of the AP that triggered the emergency to the centralized emergency manager. In one example of block 510, wireless access point 108(1) sends an emergency reporting message 160 to centralized emergency manager 130 including network status information 712 of wireless access point 108(4) for a distress message 158 received from wireless access point 108(4) indicating failure of node 106(6).

Block 512 is a decision. If, in block 512, process 500 determines that N transmission period have passed, process 500 continues with block 514; otherwise, process 500 continues with block 504. In block 514, process 500 removes members not present for N transmission periods from the network list. In one example of block 514, wireless access point 108(1) removes wireless access point 108(5) from the network list when no transmission 306 has been received from wireless access point 108(4) for sixteen transmission periods 304. Wireless access points 108 that are members (e.g., operating on an emergency channel 206) of ad-hoc wireless network 100, periodically send a transmission (e.g., transmission 306) to the master wireless access point (e.g., wireless access point 108(1)) to indicate that it is still a member. Accordingly, N defines a maximum number of transmission periods 304 between these transmissions. When the master wireless access point has not received a transmission from a particular wireless access point for more than N transmission periods 304 (or for 2N periods to be safe), the master wireless access point assumes that particular wireless access point has left the ad-hoc wireless network, updating the list of members and other information accordingly. In block 516, process 500 sends a request to other AP to take master AP responsibilities when it determines not to remain master AP of this ad-hoc wireless network. After that, it becomes a terminator AP (e.g., a regular non-master wireless access point). In one example of block 516, wireless access point 108(1) sends a request to other wireless access points of ad-hoc wireless network 100 requesting that one of them takes over the role of master wireless access point for the ad-hoc wireless network 100. When another wireless access point 108 responds and assumes the master role, the wireless access point 108(1) transitions to operate as a terminator AP (e.g., as a non-controlling member of ad-hoc wireless network 100). Process 500 then terminates and may be repeated at least periodically or aperiodically. For example, depending on the capabilities/resources of the wireless access point, when resources are available, process 500 may repeat continuously in a loop. When resources are shared with another protocol (e.g., Wi-Fi), then process 500 may be invoked periodically or aperiodically when resources are available.

FIG. 6 is a flowchart illustrating one example process for maintaining ad-hoc wireless network 100. Process 500 is for example implemented within each of wireless access points 108(2)-(5) of FIG. 1 when wireless access point 108(1) operates as master AP of ad-hoc wireless network 100.

In block 602, process 600 listens across the emergency channel for transmissions from controller AP and other members of the ad-hoc wireless network. In one example of block 602, software module 114(1) controls wireless access point 108(4) to monitor emergency channel 206 during transmission period 304 to receive transmission 308 from master wireless access point 108(1) and transmissions 306 from other wireless access points 108. In block 604, process 500 transmits an "I am alive and well" message to maintain occupancy of the allocated emergency subcarrier group. In one example of block 604, software module 114(4) controls wireless access point 108(4) to transmit network occupancy message 150 using emergency subcarrier group 204(7). In block 606, process 600 listens to emergency channel to determine ID, characteristics, and metrics, of other ad-hoc wireless network members. In one example of block 606, software module 114(4) controls wireless access point 108 (4) to listen on emergency channel 206 during transmission periods 304 to receive network status information 712, including ID, characteristics, and metrics, of other wireless access points 108 of ad-hoc wireless network 100. In block 608, process 600 stores information transmitted by controller AP and other ad-hoc wireless network members. In one example of block 608, wireless access point 108(4) stores network status information 712 received from wireless access points 108(1), 108(2), 108(3), and 108(5).

In block 610, process 600, for a received distress message or a detected emergency event, sends emergency reporting message with information of the AP that triggered the emergency to the centralized emergency manager. In one example of block 610, wireless access point 108(4) sends emergency reporting message 160 to centralized emergency manager 130 including network status information 712 of wireless access point 108(2) when receiving a distress message 158 from wireless access point 108(2) indicating failure of node 106(1). In block 612, process 600 provides emergency backhaul connectivity to an AP in distress if needed. In one example of block 612, software module 114(2) controls wireless access point 108(2) to provide emergency backhaul connectivity to wireless access point 108(1) when cable 107 fails, allowing wireless access point 108(1) to communicate with network provider 102(1) via wireless access point 108(2) and node 106(1).

Block 614 is a decision. If, in block 614, process 600 determines that N transmission period have passed, process 600 continues with block 616; otherwise, process 600 continues with block 604.

In block 616, process 600 sends an emergency leave message to trigger an emergency event. Process 600 performs block 616 when a network event or imminent power outage is detected within the wireless access point 108. In one example of block 616, wireless access point 108(4) sends an emergency leave message as transmission 306(2) using emergency subcarrier group 204(7). Other wireless access points 108 of ad-hoc wireless network 100 may assume that the emergency leave message indicates imminent failure of wireless access point 108(4), and therefore emergency leave message is handled similarly to a distress message.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An ad-hoc wireless network method for failure reporting and emergency communication of a conventional network, comprising:
controlling a wireless access point to implement access to the conventional network over a wireless channel using a plurality of subcarriers;
controlling the wireless access point to communicate, using an emergency channel having a plurality of emergency subcarrier groups, with at least one other wireless access point to form an ad-hoc wireless network;
storing, at the wireless access point, network status information of the conventional network received from the other wireless access point via the ad-hoc wireless network;
receiving, via the ad-hoc wireless network and from the other wireless access point, a distress message indicating failure of the conventional network; and
sending, from the wireless access point, an emergency reporting message including the network status information to a centralized emergency manager;
wherein each of the emergency subcarrier groups uses a group of subcarriers, smaller in number than a number of subcarriers used for the wireless channel, to increase a transmission range of the wireless access point for the ad-hoc wireless network.

2. The ad-hoc wireless network method of claim 1, wherein the wireless access point implements a Wi-Fi network for the conventional network.

3. The ad-hoc wireless network method of claim 2, wherein the Wi-Fi network and the ad-hoc wireless network are time division multiplexed.

4. The ad-hoc wireless network method of claim 2, wherein the wireless channel is one of fourteen channels, and each of the fourteen channels has sixty-four subcarriers.

5. The ad-hoc wireless network method of claim 4, wherein each of the emergency subcarrier groups has three subcarriers.

6. The ad-hoc wireless network method of claim 4, wherein the first channel and the emergency channel occupy the same portion of the frequency spectrum.

7. The ad-hoc wireless network method of claim 1, further comprising listening on the ad-hoc wireless network to determine which of the plurality of emergency subcarrier groups are used by the other wireless access point and selecting an unused one of the emergency subcarrier groups for use by the wireless access point to transmit over the ad-hoc wireless network.

8. The ad-hoc wireless network method of claim 7, wherein the wireless access point receives all subcarriers of the emergency channel.

9. The ad-hoc wireless network method of claim 1, further comprising providing backhaul connectivity to the other wireless access point when the conventional network fails.

10. A wireless access point, comprising:
at least one radio operable to simultaneously transmit one or more subcarriers of a channel and receive one or more subcarriers of the channel;
a processor; and
a memory communicatively coupled with the processor and storing machine readable instructions that, when executed by the processor, control the processor to:
control the radio to implement access to the conventional network over a wireless channel using a plurality of subcarriers;
control the radio to communicate, using an emergency channel having a plurality of emergency subcarrier groups, with at least one other wireless access point to form an ad-hoc wireless network;
store network status information of the conventional network received from the other wireless access point via the ad-hoc wireless network;
receive, via the ad-hoc wireless network and from the other wireless access point, a distress message indicating failure of the conventional network; and
send, from the wireless access point, an emergency reporting message including the network status information to a centralized emergency manager;
wherein each of the emergency subcarrier groups uses a group of subcarriers, smaller in number than a number of subcarriers used for the wireless channel, to increase a transmission range of the wireless access point for the ad-hoc wireless network.

11. The wireless access point of claim 10, further comprising machine readable instructions that, when executed by the processor, control the processor to control the radio to implement a Wi-Fi network for the conventional network.

12. The wireless access point of claim 11, wherein the Wi-Fi network and the ad-hoc wireless network are time division multiplexed.

13. The wireless access point of claim 11, wherein the wireless channel is one of fourteen channels, and each of the fourteen channels has sixty-four subcarriers.

14. The wireless access point of claim 13, wherein each of the emergency subcarrier groups has three subcarriers.

15. The wireless access point of claim 13, wherein the first channel and the emergency channel occupy the same portion of the frequency spectrum.

16. The wireless access point of claim 10, further comprising machine readable instructions that, when executed by the processor, control the processor to:
listen on the ad-hoc wireless network to determine which of the plurality of emergency subcarrier groups are used by the other wireless access point; and
control the radio to use an unused one of the emergency subcarrier groups to transmit over the ad-hoc wireless network.

17. The wireless access point of claim 16, further comprising machine readable instructions that, when executed by the processor, control the processor to control the radio to receive using all subcarriers of the emergency channel.

18. The wireless access point of claim 10, further comprising machine readable instructions that, when executed by the processor, control the processor to provide backhaul connectivity to the other wireless access point via the ad-hoc wireless network when the conventional network fails.

* * * * *